March 5, 1963

P. H. YOUNG 3,080,031

RELEASIBLE COUPLING

Filed Sept. 29, 1960

INVENTOR.
PETER H. YOUNG

BY

Robert W. Ely
ATTORNEY

United States Patent Office 3,080,031
Patented Mar. 5, 1963

3,080,031
RELEASIBLE COUPLING
Peter H. Young, Clinton, N.Y., assignor to The Bendix Corporation, a corporation of Delaware
Filed Sept. 29, 1960, Ser. No. 59,227
7 Claims. (Cl. 192—101)

This invention relates to arrangements wherein an engine having a connection in a mounting pad drives an accessory such as a generator and more particularly concerns such arrangements requiring quick disconnecting of the engine input to the driven accessory when there is an emergency condition such as occurs in aircraft.

In some current arrangements, an axially-moved operating device is often provided between the accessory and the mounting pad so that the overhang of the accessory is undersirably increased. Also some current arrangements often require radially-extending bulky operating means at the drive end of the accessory where there often is little space available. Another disadvantage is found in arrangements where engaging a rapidly revolving part by some device is necessary which obviously entails rapid wear.

An object of the present invention is to provide a disconnect arrangement which avoids these disadvantages and which requires a minimum of space at the drive end of the accessory. Another object is the provision of an improved combination of an accessory and disconnect wherein a coupling having curvic teeth at the drive end of the accessory is actuated by means at the other end of the accessory. A further object is the provision of an emergency disconnectible coupling in which locking means for engaged curvic teeth is released by contacting the end of an axially-centered actuator rod. An additional object is to provide radially-compact, fast-acting disconnecting coupling which has toggles in the axial plane of the coupling and a cam plate for collapsing the toggles. Another object is to provide an improved disconnecting coupling in which a compact locking means having an axially-centered actuator rod for cam-released toggles is self-resetting when the operating force is removed.

The realization of these objects will be apparent, along with features and advantages of the present invention, from the following description and accompanying drawing in which.

Figure 1:
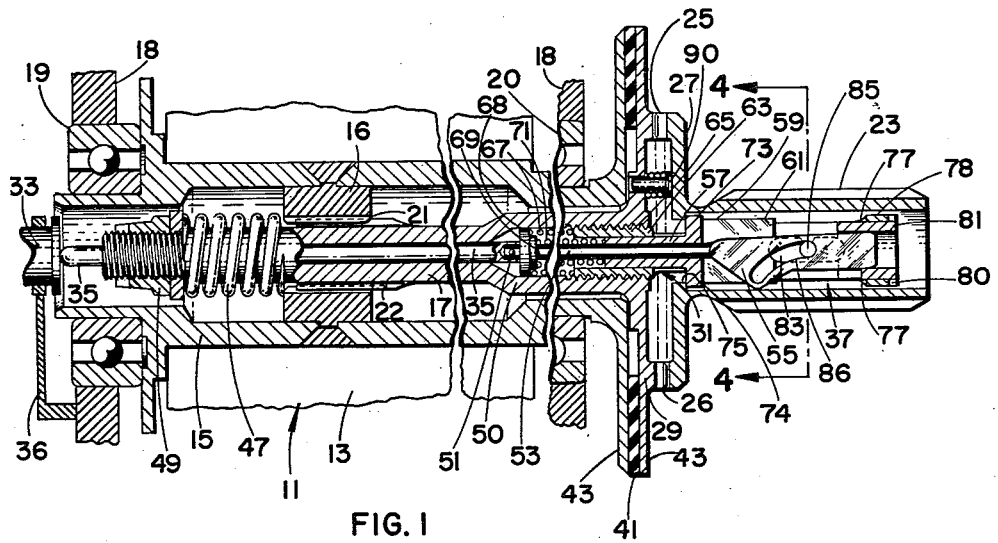
FIG. 1 is a side cross-sectional view with parts broken away of an embodiment of the invention and shows the combination of an accessory releasibly coupled to an engine-connecting member by means including curvic teeth at the drive end of the accessory and operating means at the other end of the accessory.

Referring to FIG. 1 of the drawing, a generator 11 is schematically shown at the left and has its armature 13 mounted on hollow accessory shaft 15. Shaft 15 is driven by the hollow driven quill shaft 17 which extends into accessory shaft 15. The generator housing 18 supports bearings 19 and 20 which rotatably-mount generator shaft 15. The connection is provided by female splines 21 of a ring 16 extending inwardly from accessory shaft 15 and male spline 22 on driven shaft 17. Driven shaft 17 is in turn driven by the hollow engine-connecting drive shaft 23 at the right by means of curvic teeth 25 and 26. Teeth 25 are formed in the radially-extending input flange 27 of the drive shaft 23. Teeth 26 are formed in an output flange 29 of driven shaft 17 which faces flange 27. Releasible locking means 31 is carried by driven shaft 17 and extends into drive shaft 23 so that the driving connection is provided by the curvic teeth 25 and 26 until an emergency requires a quick disconnect of the generator 11 from the engine (not shown) connected to externally-splined drive shaft 23.

For disconnecting, an operating device 33 at the left is operable so that axial motion to the right is imparted to actuator rod 35 extending axially through and projecting from the driven shaft 17. Operating device 33 is supported by bracket 36 attached to housing 18. Rod 35 is connected to the releasible latch device 37 of the locking means which is within externally-splined drive shaft 23. The foregoing comprises a driven-accessory combination in which an engine-powered drive shaft 23 is drivingly coupled to an axially-aligned shaft of an accessory with provision for disconnecting. It is apparent that the combination requires a minimum axial space between the engine-connecting drive shaft 23 and the accessory 11 since the actuating means of the locking means 31 extends axially through the accessory and the operating means 33 is located at the side of the accessory opposite the engine.

Vibrations are dampened by means of a rubber friction plate 41 between a peripheral extension 43 from driven shaft flange 29 and the generator shaft flange 45. These elements are urged together by spring 47 around the left end of the driven shaft 17. Spring 47 is confined by nut 49 threaded on the driven shaft 17 and the left end of splines 21 of generator shaft 15.

Figure 2:
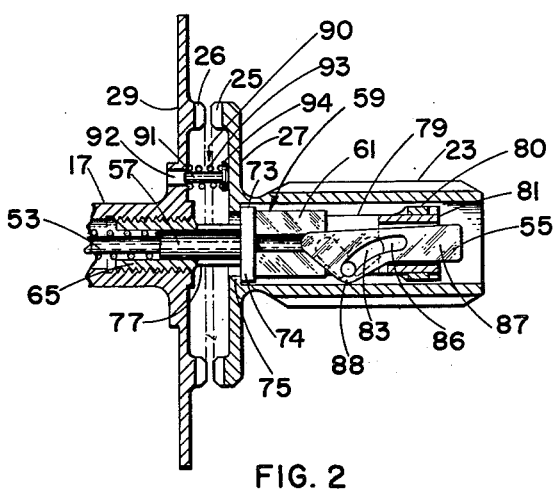
FIG. 2 is a side cross-sectional view of the disconnectible coupling of FIG. 1 when disconnected and shows the toggles collapsed and the spacing means to prevent clashing of the curvic teeth.
Figure 3:
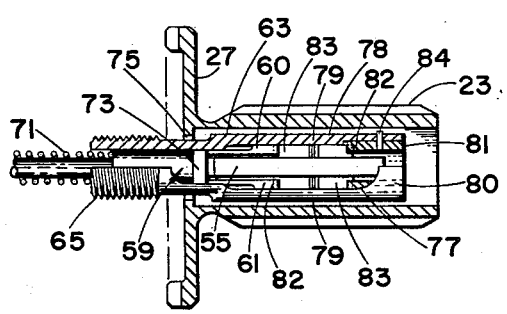
FIG. 3 is a top cross-sectional view of the engine-connecting member and locking toggle means of FIG. 1 and shows the carrier or support member accomodating the locking element, parts of the toggles and the cam plate.
Figure 4:
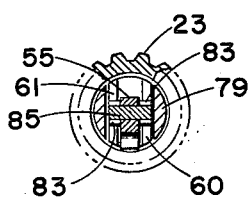
FIG. 4 is a transverse cross-sectional view along the line 4—4 of FIG. 1 and shows carrier webs at the ends of the toggle pin and the ends of the toggles and locking element.

With reference to FIGS. 1–4, the details of the locking means 31 will be described. Rod 35 slides in driven shaft 17 and is connected at the enlarged end 50 of the quill shaft 17 by pin 51 to the left end of an extension 53 of a cam plate 55. Cam rod or extension 53 extends through the tubular part 57 of locking element 59. Cam plate 55 is of general-rectangular shape and is received in the vertical slot formed by fingers 60 and 61 of fork-shaped locking element 59 (see FIG. 3). The tubular part 57 of locking element 59 is slidably received in a support or carrier member 63 which is threaded into the flange end of the driven shaft 17. The left end of the threaded tubular neck or attachment part 65 of the support member 63 confines the left end of a return coil spring 67. The other end of return spring 67 is confined by the larger circular shoulder 68 of cam extension 53. Shoulder 68 is slidably mounted in the enlarged end 50 of the driven shaft 17. A smaller circular shoulder 69 confines the left end of toggle tension spring 71 while the right end abuts the end of the tubular part 57 of the locking element 59. Locking element or fork 59 has upper and lower radial projections 73 and 74 at the juncture of its two fingers 60 and 61 and its tubular part 57. These projections 73, 74 abut at the left the inwardly-extending shoulder 75 of drive shaft 23 so curvic teeth 25, 26 are engaged when projections 73, 74 are fixed axially. Projections 73, 74 extend out through top and bottom, generally-oval-shaped openings 77 in the neck 65 and the larger cylindrical part 78 of bottle-shaped support member 63 (see FIG. 3). The webs 79 extending from the threaded neck 65 merged into the right ring section 80. Referring to FIG. 3, a collar 81 is mounted in ring section 80. Collar 81 and fingers 60, 61 have semi-circular recesses 82 at each side of cam plate 55 respectively for the two right and left elements of toggle links 83. Collar 81 is mounted by pin 84 (see FIG. 3). Toggle links 83 include fulcrum pin 85. Cam plate 55 has an arcuate cam slot 86 adapted to move the toggle fulcrum pin 85 downwardly upon rightward axial movement of the cam plate 55, thus collapsing the toggles and permitting self-separation of curvic teeth 25, 26 to move drive shaft 23 to the right in the spline of the engine. The webs 79 of the carrier member 63 confine the toggle links 83 and fulcrum pin 85 at the sides thereof.

It is to be noted in FIG. 2 that the cam plate 55 has rectangular guide section 87 in collar 81 and a triangular hump section 88 having the axially-displaced part of the cam slot 86. This hump section 88 limits the rightward movement of the cam plate 55 by abutting the lower edge of the cam plate guide collar 81. When the curvic teeth 25, 26 separate, clashing is prevented by a plurality of spring-biased carbon plungers 90 which constitute one form of spacing means. Referring to FIG. 2, the cylindrical part of the plungers 91 is received in recesses 92 and springs 93 are confined by the button or head 94 and the face of flange 29 around the recesses 92.

In normal operation, it is apparent that an engine connected to engine-connecting shaft 23 will transmit torque through curvic teeth 25, 26 and the splines 22, 21 of driven shaft 17 and generator shaft 15 so that the generator 11 or other accessory such as a pump is operated. Engagement at the curvic teeth 25, 26 is maintained by the aligned toggles 83 holding the locking projections 73, 74 against the locking shoulder 75 of the axially-movable engine-connecting shaft 23 so that the teeth 25 thereof operatively engage the teeth 26 of the driven shaft flange 29 which is axially-fixed. When the generator 11 malfunctions and disconnect during torque transmission is required, the pilot of the aircraft actuates the operating means 33 whereby rapid rightward motion is imparted to the actuator rod 35 of the locking means 31. This action through the connection to the cam plate extension 53 shifts the cam plate 55 to the right causing the rapid collapse of the toggles 83 as the fulcrum pin 85 is moved down. Locking element 59 is thus released and slides to the right. The urging of spring 71 maintains the toggles 83 assembled about pin 85. As the locking projections 73, 74 of locking element 59 move to the right, the curvic teeth 25, 26 are no longer axially-restrained and separate. As the curvic teeth 25, 26 rapidly disengage due to their self-separating axially-extending inclined sides, the spacing plungers 90 will follow the face of the flange 27 of the engine-connecting shaft 23 as it moves axially within the internally-splined engine output member (not shown). Cam plate 55 will be limited to the position shown in FIG. 2 by its pump section 88 abutting cam guide collar 81. As shown in FIG. 2, the spacers 90 will prevent clashing of the curvic teeth 25, 26 when uncoupling has been effected due to an emergency during operation.

When re-engagement is desired after all rotation has stopped and the cause for operating the emergency disconnect arrangement has been corrected, the operating means 33 is returned to normal position as shown in FIG. 1 and the curvic teeth 25, 26 are aligned so that the return spring 67 will effect re-engagement and the repositioning of the locking means 31. The toggles 83 will then be aligned as shown in FIG. 1 and tensioned by spring 71 into contact with the fulcrum pin 85 positioned by the cam plate slot 86 under the urging of return spring 67 abutting the cam plate extension shoulder 68. Projections 73, 74 will thus lock the curvic teeth 25, 26 by abutting shoulder 75 as constrained by the tensioned and aligned toggles 83.

It is to be noted that a minimum of space is required between the engine and the accessory because the actuator rod 35 extends through the accessory 11 and the operating means 33 is at the end of the accessory which is remote from the engine. Noteworthy also is the compactness of the coupling and locking means.

It is to be understood that persons skilled in the art can make changes in the disclosed embodiment without departing from the invention as defined in the following claims.

What is claimed is:

1. A driven accessory combination comprised of a hollow drive shaft constructed to be connected to an engine with provision for axial movement relative to the engine, an accessory having a housing and a hollow shaft aligned with said drive shaft, a hollow driven shaft extending from said drive shaft into and being connected to said accessory shaft, said drive and driven shafts having facing flanges, said accessory shaft having one end adjacent said driven shaft flange and its other end spaced therefrom, said driven shaft having a first open end adjacent its flange and a second open end adjacent said other end of said accessory shaft, said facing flanges having mating teeth which have inclined axially-extending sides, said teeth being engaged whereby a driving coupling is formed between said drive shaft and said driven shaft, locking means carried by said driven shaft and extending into said drive shaft, said locking means normally urging said drive shaft toward said driven shaft, said locking means including a releasible latch device and an actuator rod device, said rod device being operably connected to said latch device and extending along the axis of said driven shaft, said rod device projecting from said second end of said driven shaft, operating means mounted on said housing of said accessory, said operating means being arranged to move said actuator rod device axially so that said latch device is released and said teeth will separate moving said drive shaft from said driven shaft, and spacing means extending between said shafts constructed to space said driven shaft so that said teeth remain out of contact when said teeth disengaged.

2. A driven accessory combination comprised of a hollow drive shaft constructed to be connected to an engine with provision for axial movement relative to the engine, an accessory having a housing and a hollow shaft aligned with said drive shaft, a hollow driven shaft extending from said drive shaft into and being connected to said accessory shaft, said drive and driven shafts having facing flanges, said accessory shaft having one end adjacent said driven shaft flange and its other end spaced therefrom, said driven shaft having a first open end adjacent its flange and a second open end adjacent said other end of said accessory shaft, said facing flanges having mating teeth which have inclined axially-extending sides, said teeth being engaged whereby a driving coupling is formed between said drive shaft and said driven shaft, locking means carried by said driven shaft and extending into said drive shaft, said locking means normally urging said drive shaft toward said driven shaft, said locking means including a releasible latch device and an actuator rod device, said rod device being operably connected to said latch device and extending along the axis of said driven shaft, said rod device projecting from said second end of said driven shaft, operating means mounted on said housing of said accessory, said operating means being arranged to move said actuator rod device axially so that said latch device is released and said teeth will separate moving said drive shaft from said driven shaft, spacing means extending from said driven shaft flange constructed to space said drive shaft so that said teeth remain out of contact when said teeth disengaged, said driven shaft being connected to said accessory shaft by means of external splines on said driven shaft and mating splines on a ring projecting radially from said accessory shaft, said rod device being slidably mounted in said driven shaft.

3. A driven accessory combination comprised of a hollow drive shaft constructed to be connected to an engine with provision for axial movement relative to the engine, an accessory having a housing and a hollow shaft aligned with said drive shaft, a hollow driven shaft extending from said drive shaft into and being connected to said accessory shaft, said drive and driven shafts having facing flanges, said accessory shaft having one end adjacent said driven shaft flange and its other end spaced therefrom, said driven shaft having a first open end adjacent its flange and a second open end adjacent said other end of said accessory shaft, said facing flanges having mating teeth which have inclined axially-extending sides, said teeth being engaged whereby a driving coupling is formed between said drive shaft and said driven shaft, locking means carried by said driven shaft and extending into said drive shaft, said locking means normally urging said drive shaft toward said driven shaft, said locking means including a releasible latch device and an actuator rod device, said rod device being operably connected to said latch device and extending along the axis of said driven shaft, said rod device projecting from said second end of said driven shaft, operating means mounted on said housing of said accessory, said operating means being arranged to move said actuator rod device axially so that said latch device is released and said teeth will separate moving said drive shaft from said driven shaft, spacing means extending between said shafts constructed to space said driven shaft so that said teeth remain out of contact when said teeth are disengaged, said latch device including a cam plate having an arcuate slot and toggles having a fulcrum pin received in said slot, said toggles being normally axially-aligned with said rod device, said cam plate being axially connected to said rod device and being constructed to collapse said toggles when moved by said operating means, said latch device including an axially-movable locking element normally urged against said drive shaft by said axially-aligned toggles to maintain engagement of said teeth.

4. An emergency disconnect coupling comprised of a hollow driven shaft, said driven shaft having external splines adapted to be connected to mating splines of an accessory shaft, a hollow engine-connecting drive shaft having external splines, said shafts having facing radial flanges with mating curvic teeth and being coupled by engagement of said teeth, a hollow support member having an attachment part threaded into the flange end of said driven shaft and having a support part extending into said drive shaft, said support part having two axially-extending openings, a forked locking element having a tubular extension, said tubular extension being slidably-mounted in said attachment part of said support member, said drive shaft having an inwardly-projecting shoulder, said locking element having locking projections extending through said openings in said support member and abutting said shoulder, said locking element having two arms received in said support part of said support member, the end of the support part of said support member having a guide opening, a cam plate mounted in said guide opening and between said arms of said locking element, said cam plate having an actuator extension extending through said tubular extension of said locking element, said arms of said locking element and said support part of said support member having axial facing recesses at the sides of said cam plate for toggle elements, axially-aligned toggles at each side of said cam plate having a toggle element extending from each of said recesses and having a toggle fulcrum pin abutting the facing ends of said toggle elements, said cam plate having a cam slot receiving said fulcrum pin and adapted to collapse said toggles.

5. An emergency disconnect coupling comprised of a hollow driven shaft, said driven shaft having external splines adapted to be connected to mating splines of an accessory shaft, a hollow engine-connecting drive shaft having external splines, said shafts having facing radial flanges with mating curvic teeth and being coupled by engagement of said teeth, a hollow support member having an attachment part threaded into the flange end of said driven shaft and having a support part extending into said drive shaft, said support part having two axially-extending openings, a forked locking element having a tubular extension, said tubular extension being slidably-mounted in said attachment part of said support member, said drive shaft having an inwardly-projecting shoulder, said locking element having locking projections extending through said openings in said support member and abutting said shoulder, said locking element having two arms received in said support part of said support member, the end of the support part of said support member having a guide opening, a cam plate mounted in said guide opening and between said arms of said locking element, said cam plate having an actuator extension extending through said tubular extension of said locking element, said arms of said locking element and said support part of said support member having axial facing recesses at the sides of said cam plate for toggle elements, axially-aligned toggles at each side of said cam plate having a toggle element extending from each of said recesses and having a toggle fulcrum pin abutting the facing ends of said toggle elements, said cam plate having a cam slot receiving said fulcrum pin and adapted to collapse said toggles, said driven rod being elongated, an actuator rod connected to said cam plate extension and extending through said driven shaft and slidably supported therein for axial movement by operating means.

6. An emergency disconnect coupling comprised of a hollow driven shaft, said driven shaft having external splines adapted to be connected to mating splines of an accessory shaft, a hollow engine-connecting drive shaft having external splines, said shafts having facing radial flanges with mating curvic teeth and being coupled by engagement of said teeth, a hollow support member having an attachment part threaded into the flange end of said driven shaft and having a support part extending into said drive shaft, said support part having two axially-extending openings, a forked locking element having a tubular extension, said tubular extension being slidably-mounted in said attachment part of said support member, said drive shaft having an inwardly-projecting shoulder, said locking element having locking projections extending through said openings in said support member and abutting said shoulder, said locking element having two arms received in said support part of said support member, the end of the support part of said support member having a guide opening, a cam plate mounted in said guide opening and between said arms of said locking element, said cam plate having an actuator extension extending through said tubular extension of said locking element, said arms of said locking element and said support part of said support member having axial facing recesses at the sides of said cam plate for toggle elements, axially-aligned toggles at each side of said cam plate having a toggle element extending from each of said recesses and having a toggle fulcrum pin abutting the facing ends of said toggle elements, said cam plate having a cam slot receiving said fulcrum pin and adapted to collapse said toggles, said cam actuator extension having a first shoulder and radially-inwardly thereof a second shoulder, a return spring confined between said first shoulder and the end of said attachment part of said support member, a toggle tension spring confined between said second shoulder and the end of said tubular extension of said locking element, spacing means extending between the flanges of said shafts constructed to prevent clashing of said curvic teeth when said toggles are collapsed.

7. An emergency disconnect coupling comprised of a hollow driven shaft, said driven shaft having external splines adapted to be connected to mating splines of an accessory shaft, a hollow engine-connecting drive shaft having external splines, said shafts having facing radial flanges with mating curvic teeth and being coupled by engagement of said teeth, a hollow support member having an attachment part threaded into the flange end of said driven shaft and having a support part extending into said drive shaft, said support part having two axially-extending openings, a forked locking element having a tubular extension, said tubular extension being slidably-mounted in said attachment part of said support member, said drive shaft having an inwardly-projecting shoulder, said locking element having locking projections extending through said openings in said support member and abutting said shoulder, said locking element having two arms received in said support part of said support member, the end of the support part of said support member having a guide opening, a cam plate mounted in said guide opening and between said arms of said locking element, said cam plate having an actuator extension extending through said tubular extension of said locking element, said arms of said locking element and said support part of said support member having axial facing recesses at the sides of said cam plate for toggle elements, axially-aligned toggles at each side of said cam plate having a toggle element extending from each of said recesses and having a toggle fulcrum pin abutting the facing ends of said toggle elements, said cam plate having a cam slot receiving said fulcrum pin and adapted to collapse said toggles, said cam actuator extension having a first shoulder and radially-inwardly thereof a second shoulder, a return spring confined between said first shoulder and the end of said attachment part of said support member, a toggle tension spring confined between said second shoulder and the end of said tubular extension of said locking element, said cam plate having a hump section extending through one of said openings in said support members, said hump section having part of said cam slot therein, said cam plate hump section being constructed to abut said support member to limit axial movement of said cam plate, spacing means extending between the flanges of said shafts constructed to prevent clashing of said curvic teeth when said toggles are collapsed, said driven rod being elongated, an actuator rod connected to said cam plate extension and extending through said driven shaft and slidably supported therein for axial movement by operating means.

References Cited in the file of this patent

UNITED STATES PATENTS

| | | |
|---|---|---|
| 374,908 | Sellers et al. | Dec. 13, 1887 |
| 754,644 | Davis | Mar. 15, 1904 |
| 800,728 | Ellis et al. | Oct. 3, 1905 |
| 807,682 | Miller | Dec. 19, 1905 |
| 2,875,876 | Rudisch | Mar. 3, 1959 |